(12) United States Patent
Grundström et al.

(10) Patent No.: US 10,726,561 B2
(45) Date of Patent: Jul. 28, 2020

(54) METHOD, DEVICE AND SYSTEM FOR DETERMINING WHETHER PIXEL POSITIONS IN AN IMAGE FRAME BELONG TO A BACKGROUND OR A FOREGROUND

(71) Applicant: Axis AB, Lund (SE)

(72) Inventors: Jakob Grundström, Lund (SE); Joakim Baltsén, Lund (SE); Simon Molin, Lund (SE); Hanna Björgvinsdóttir, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/436,391

(22) Filed: Jun. 10, 2019

(65) Prior Publication Data

US 2019/0385312 A1 Dec. 19, 2019

(30) Foreign Application Priority Data

Jun. 14, 2018 (EP) .................................... 18177775

(51) Int. Cl.
*G06T 7/194* (2017.01)
*G06K 9/00* (2006.01)
*G06T 7/70* (2017.01)

(52) U.S. Cl.
CPC .......... *G06T 7/194* (2017.01); *G06K 9/00718* (2013.01); *G06K 9/00765* (2013.01); *G06T 7/70* (2017.01); *G06T 2207/10016* (2013.01)

(58) Field of Classification Search
USPC ................................................. 382/103, 173
See application file for complete search history.

(56) References Cited

U.S. PATENT DOCUMENTS

| | | | |
|---|---|---|---|
| 8,009,918 B2* | 8/2011 | Van Droogenbroeck | G06K 9/38 382/181 |
| 8,204,316 B2 | 6/2012 | Panahpour Tehrani et al. | |
| 8,285,046 B2 | 10/2012 | Cobb et al. | |
| 9,530,221 B2 | 12/2016 | Zhu et al. | |
| 9,584,814 B2* | 2/2017 | Socek | G06T 7/254 |
| 10,152,645 B2* | 12/2018 | Baltsen | G06K 9/00718 |
| 10,375,399 B2* | 8/2019 | Wang | H04N 19/58 |
| 10,489,916 B2* | 11/2019 | Baltsten | G06K 9/6202 |
| 10,614,736 B2* | 4/2020 | Van Droogenbroeck | G06T 7/11 |
| 2006/0067562 A1* | 3/2006 | Kamath | G06T 7/254 382/103 |
| 2006/0210159 A1* | 9/2006 | Huang | G06K 9/00261 382/173 |
| 2013/0235208 A1* | 9/2013 | Hirano | G06T 7/136 348/157 |
| 2013/0271667 A1* | 10/2013 | Tojo | H04N 5/147 348/701 |

(Continued)

OTHER PUBLICATIONS

Braham et al., "Semantic Background Subtraction," (2017).

(Continued)

*Primary Examiner* — Ishrat I Sherali

(74) *Attorney, Agent, or Firm* — Volpe and Koenig, P.C.

(57) ABSTRACT

A method, system, and apparatus related to the field of background subtraction in images is disclosed. In particular, the method, system, and apparatus is related to determining whether pixel positions in an image frame of a video sequence belongs to a background or a foreground of a captured scene using a determined level of dynamics of the pixel position.

15 Claims, 4 Drawing Sheets

(56) References Cited

U.S. PATENT DOCUMENTS

| | | | | |
|---|---|---|---|---|
| 2014/0146998 A1* | 5/2014 | Wieser | ............... | G06K 9/00771 |
| | | | | 382/103 |
| 2015/0334398 A1* | 11/2015 | Socek | ..................... | G06T 7/174 |
| | | | | 375/240.26 |
| 2017/0330050 A1 | 11/2017 | Baltsen | | |
| 2017/0358103 A1* | 12/2017 | Shao | .................. | H04N 5/23238 |
| 2018/0144476 A1* | 5/2018 | Smith | ........................ | G06T 3/40 |
| 2019/0043403 A1* | 2/2019 | Van Droogenbroeck | ..................... | |
| | | | | G06T 7/11 |
| 2019/0370984 A1* | 12/2019 | Tsai | ......................... | G06T 7/13 |

OTHER PUBLICATIONS

Bouwmans et al., "Background Modeling and Foreground Detection for Video Surveillance," CRC Press, Taylor & Francis Group, Boca Raton, (2015). (See chapters 1 and 7).

\* cited by examiner

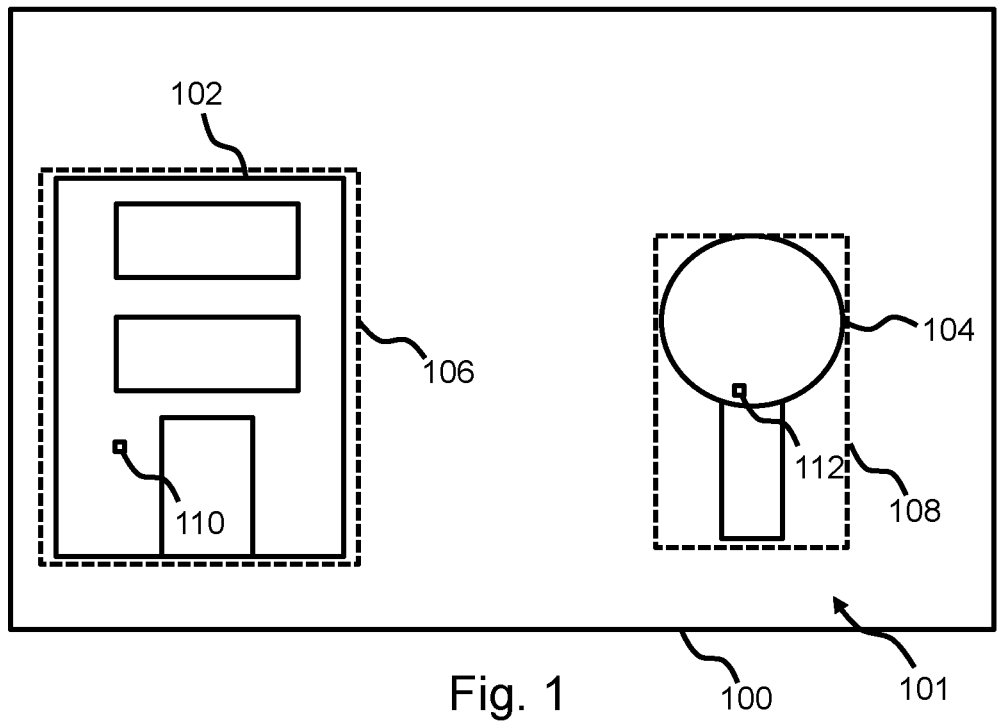
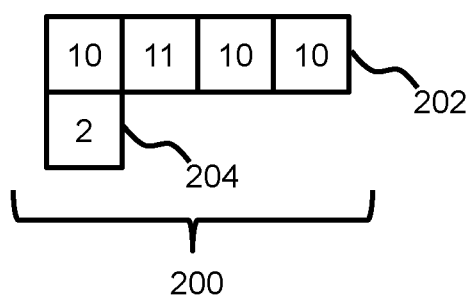
Fig. 2a
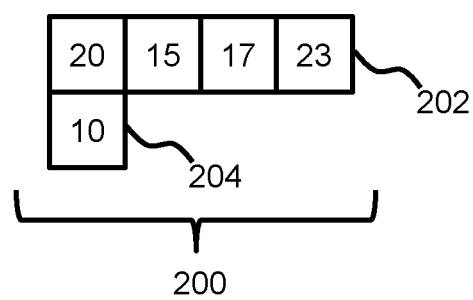
Fig. 2b
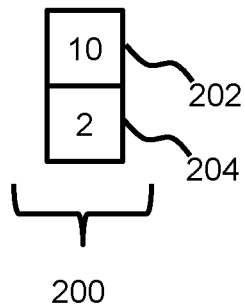
Fig. 3a
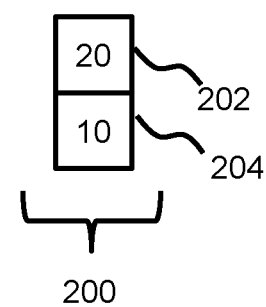
Fig. 3b

METHOD, DEVICE AND SYSTEM FOR DETERMINING WHETHER PIXEL POSITIONS IN AN IMAGE FRAME BELONG TO A BACKGROUND OR A FOREGROUND

FIELD OF INVENTION

The present teachings relate to the field of background subtraction in images. In particular, the present teachings relate to determining whether pixel positions in an image frame of a video sequence belong to a background or a foreground of a captured scene.

BACKGROUND

In video surveillance, it is important to be able to detect moving objects in a scene as captured in a video sequence. There are many tools for motion detection in videos. Some of them track objects frame by frame by following features in the video stream. Others compare a current frame with a static background frame, pixel by pixel. The latter is the basis of background subtraction which aims at extracting moving objects by detecting zones where significant change occurs. Moving objects are referred to as foreground while static objects are part of the background.

The separation of moving objects from the background is a complex problem, which becomes even more difficult if the background is dynamic, such as if there are swaying trees or water ripples in the background, or if the illumination varies. In particular, a dynamic background may result in that the number of false detections of moving objects increases.

A review of background subtraction methods is given in the text book "Background Modeling and Foreground Detection for Video Surveillance" (Editors: Thierry Bouwmans, Fatih Porikli, Benjamin Hoferlin, and Antoine Vacavant), CRC Press, Taylor & Francis Group, Boca Raton, 2015. See for example chapters 1 and 7.

Background subtraction methods generally involve a comparison of a current frame of a video stream with a reference background frame or model, free of moving objects. By comparing an image to the background frame or model, a decision may be taken whether or not each pixel in the image belongs to the foreground or the background. In this way, the image may be divided into two complementary sets of pixels—the foreground and the background.

Background subtraction requires definition of an underlying background model and an update strategy to accommodate for background changes over time. Plenty of background models have been proposed in the literature. This includes parametric models (e.g., Gaussian distribution) and non-parametric models (e.g., sample-based models).

However, in order to achieve a correct separation between background and foreground, no matter of what approach to background modelling that is employed, areas of a scene representing multi-modal environment (which means that there is a high probability of pixel values representing these areas will change values between frames of the video sequence capturing the scene) need to be handled differently when it comes to determining whether the area represents background or foreground, compared to more static areas, due to the larger differences in image content (represented by pixel values) that will inherently exist between frames in these areas.

There is thus a need for improvements within this context.

SUMMARY

In view of the above, it is thus an object of the present teachings to overcome or at least mitigate the problems discussed above. In particular, it is an object to provide a method and device for determining whether pixel positions in an image frame of a video sequence belongs to a background or a foreground of a captured scene, which consider that different probabilities exist for corresponding pixel positions to change values between frames of the video sequence capturing the scene.

According to a first aspect of the present teachings, there is provided a method of determining whether pixel positions in an image frame of a video sequence belongs to a background or a foreground of a captured scene. The method comprises, for each pixel position in the image frame: receiving a class into which the pixel position has been classified, the class representing a category of content in the captured scene at the pixel position; associating the pixel position with a level of dynamics of its corresponding class, wherein the level of dynamics of a class reflects a probability of pixel values at pixel positions belonging to the class changing values between frames of the video sequence; determining if the pixel position in the image frame belongs to the background or the foreground of the captured scene by comparing the pixel value of the pixel position in the image frame to a background model and a threshold value, the background model including one or more values representing a pixel position, wherein the pixel is determined to belong to the background if a difference between the pixel value and a first predetermined number of values representing the position in the background model is less than the threshold value for the pixel position.

If the pixel position in the image frame is determined to belong to the background, the method further comprises: increasing the threshold value specific to the pixel position by an increment if the pixel value at the pixel position in the image frame has changed by more than a second value since a previous frame, wherein the increment is set to depend on the level of dynamics of the pixel position such that a higher level of dynamics results in a higher increment.

The present teachings stem from the realization that parts of a scene which comprise dynamic background objects, such as a tree, water, flags, and the like, will result in more differences in pixel values representing these parts between frames in the video sequenced capturing the scene. Consequently, this needs to be considered when determining whether a certain pixel position in an image frame belongs to the foreground or the background of the captured scene. A larger difference between a pixel value in the image and the corresponding pixel value(s) in the background model should advantageously be allowed for an area comprising dynamic background objects, to reduce the probability that these areas are determined to belong to the foreground by mistake. The threshold (used to determine how similar a pixel value of a pixel position is to a background model for this pixel position) will in the present teachings vary with the position of the pixel in the image. In particular, it may vary depending on a tendency of the background at the position of the pixel to change values between subsequent images in the image sequence. A higher tendency of changing values may generally give a higher value of the threshold. This is advantageous in that the foreground classification may be adapted to a dynamic background, such as swaying trees, water ripples, and the like. For example, the sensitivity of the classification for determining that a pixel position belongs to the foreground may be increased in non-dynamic regions in comparison to dynamic regions.

Moreover, the threshold is advantageously more quickly updated between a lower and a higher value for dynamic areas of the image, to allow for increased differences between image frames of the video sequence. Advantageously, this will lead to swift adaptation of the threshold when the wind starts blowing in the scene and the trees and water quickly gets more dynamic. This will in turn reduce the number of erroneous classifications of foreground pixels in these areas.

In the present teachings, the scene has been divided into classes representing a category of content in the captured scene. Such classification may be referred to as semantic segmentation, classification according to type of content, and the like. By way of example, the possible classes comprise cars, trees, water, roads, people, houses, and the like. This classification may be manually made by, for example, an operator, or made using algorithms such as a semantic segmentation algorithm, for example implemented in a deep learning neural network as described in research literature such as "Fully Convolutional Networks for Semantic Segmentation" (Long et al.).

For each pixel position in an image frame of a video sequence of the scene, such a class is received, and used for associating the pixel position with a level of dynamics of its corresponding class. Such association may be done using, for example, a table mapping predefined classes into different levels of dynamics, or any other data structure defining what level of dynamics a certain class represents.

The level of dynamics of a class thus reflects a probability that pixel values at pixel positions belonging to the class will change values between frames of the video sequence. As an example, a pixel position classified as a (crown of a) tree may have a relatively high level of dynamics while a pixel position classified as a house may have a relatively low level of dynamics. The level of dynamics may span between 1-100, 0-1, 1-10 or any other suitable range of values.

The background model comprises, for each pixel position, one or more values representing the pixel position (for example pixel values of preceding image frames at the pixel position). The background model further comprises a threshold value which represents an allowable difference between a pixel value at the pixel position, and the values for the corresponding position in the background model, when determining if the pixel position belongs to the foreground or the background. In case the difference between the pixel value and a first predetermined number of values representing the position in the background model is less than the threshold value for the pixel position, the pixel position is determined to belong to the background. For example, in case the background model comprises two values (e.g., 5 and 7) for a pixel position, and the threshold value is 2, the first predetermined number is 1 and the pixel value at the pixel position is 9, the pixel position will be determined to belong to the foreground, since no differences are less than 2. However, if the pixel value at the pixel position is 7, the pixel position will be determined to belong to the background. In other words, the threshold defines the size of a range of values that the value of the pixel position may have which will result in that the pixel position is determined to belong to the background, where the range increases with an increasing threshold. For the embodiment where the background model comprises one value for each pixel position, the first predetermined number will always be 1. In the embodiments where the background model comprises a plurality of values for each pixel position, the predetermined number will be any suitable number between one and the number of values for each pixel position, depending on the use case and the sensitivity requirements for such use case when it comes to determining foreground pixels.

If the pixel position is determined to belong to the background, and the difference between the pixel value at the pixel position in the image frame is more than a second value compared to a corresponding pixel value of a previous frame, the threshold should be incremented, to fine tune the threshold, that is, based on a range of pixel values that this pixel position may have. Here the level of dynamics comes into play. For a dynamic area, the increment should advantageously be higher than for a static area, due to the higher probability that that the pixel values in such a dynamic area will change. Such a varying increment based on the dynamic level of a pixel position may reduce the number of erroneous determinations of background respective foreground pixels in image frames of a video sequence.

According to some embodiments, the method further comprises the steps of: if the pixel position in the image frame is determined to belong to the background, decreasing the threshold value specific to the pixel position by a decrement if the pixel value at the pixel position in the image frame has changed by less than the second value since a previous frame, wherein the decrement is set to depend on the level of dynamics of the pixel position such that a higher level of dynamics results in a lower decrement. Similar to the fine tuning of the threshold described above when the pixel value at the pixel position in the image frame has changed by more than the second value since a previous frame, a decrement of the threshold may be performed if the difference in pixel values between, for example, two subsequent image frames for a specific pixel position is less than the second value. In this embodiment, the decrement in dynamic areas should be lower compared to the decrement in static areas, due to the higher probability that the pixel values in such a dynamic area will change. Such a varying decrement based on the dynamic level of a pixel position may reduce the number of erroneous determination of background respective foreground pixels in image frames of video sequence.

In some embodiments, the decrements for a dynamic area is lower than the corresponding increment. Since the increment value is larger than the decrement value, the method is allowed to quickly respond to increased dynamics in the background, which for instance may be due to changing wind conditions in the scene. At the same time, the threshold will have a slower decrease for dynamic areas compared to for static areas, which is advantageous since dynamic background movement is likely to happen again.

According to some embodiments, the method further comprises: setting the threshold value which is specific to the pixel position to a value, wherein the value depends on the level of dynamics of the pixel position such that a higher level of dynamics results in a higher value. This embodiment thus defines an initialization of the threshold value, or a resetting of the threshold value, that may be performed, for example, for an initial frame of the video stream, and/or when a field of view of a video capturing device capturing the video sequence is changed. By initializing/setting the threshold value for a specific pixel position depending on the level of dynamics associated with that pixel position, the fine tuning of the threshold values performed during subsequent image frames will be performed faster, since the threshold values probably will be more correct from the start (e.g., compared to setting the threshold for all pixel positions to a predetermined value such as zero, or to a random value). This embodiment may further reduce the number of erroneous determination of background respective foreground pixels in image frames of video sequence, for example when starting the video capturing, or changing field of view.

According to some embodiments, the method further comprises setting a lower threshold for the threshold value which is specific to the pixel position depending on the level of dynamics of the pixel position, the lower threshold determining a minimum possible value for the threshold value, such that a higher level of dynamics results in a higher value of the lower threshold. That is, the threshold values cannot get lower than those lower thresholds, leading to that the background model is always less sensitive to dynamic areas such as trees.

According to some embodiments, the pixel position is associated with a first level of dynamics if its corresponding class belongs to a first predefined group of classes, and the pixel position is associated with a second, higher, level of dynamics if its corresponding class belongs to the second predefined group of classes. For example, only two levels of dynamics may be defined, one for a static class such as representing houses in the scene, and one for dynamic classes such as representing trees or water in the scene. In other embodiments, a finer grained model is implemented, for example defining a first lowest level of dynamics for pixel positions representing a house in the scene, a second middle level of dynamics for pixel positions representing a water in the scene, and a third highest level of dynamics for pixel positions representing a tree in the scene.

According to some embodiments, if the class corresponding to the pixel position belongs to a third predefined group of classes, the threshold value which is specific to the pixel position is maintained at a constant level. In this embodiment, the threshold values for the pixel positions being classified as belonging to the third predefined group of classes is maintained at a constant level.

According to some embodiments, the class into which the pixel position has been classified is determined using an algorithm for semantic segmentation, as also exemplified above.

According to some embodiments, the algorithm for semantic segmentation is run on a subset of image frames of the video stream. In this embodiment, the semantic segmentation is not performed for every image frame in the video stream. Different time spans between two semantic segmentation operations on the video stream may be used, for example, minutes or hours, or even days. The time span may depend on how much that happens in the background of the scene that is captured. A longer time span reduces the computational requirements for the method, since semantic algorithms may be rather hardware demanding, making it difficult (or impossible) to get real time results from the algorithm.

According to some embodiments, the class into which the pixel position has been classified is determined using a combination of results from the semantic algorithm for said pixel position from a plurality of image frames in said subset of image frames. In other word, previous results from the classification for a certain pixel position may be used in conjunction with a new result, for example to reduce the risk of erroneous classifications.

According to some embodiments, the background model includes a plurality of values representing a pixel position, wherein the step of determining if the pixel position in the image frame belongs to the background or the foreground of the captured scene comprises: calculating a difference between a pixel value in the image frame at the pixel position and the plurality of values of the background model at the corresponding pixel position; calculating a number of differences being lower than the threshold value which is specific to the pixel position; determining that the pixel position in the image frame belongs to the background if the calculated number exceeds the first predetermined number of values, and that the pixel position in the image frame otherwise belongs to the foreground.

This embodiment may, depending on the value of the first predetermined number of values, result in a determination which is more or less sensitive to differences between the value of the currently processed image frame and the values of the background model. In some embodiments, a majority of differences is required to be lower than the threshold value to result in a background pixel. In other embodiments, ⅓, ⅔ or any other suitable number difference is required to be lower than the threshold value to result in a background pixel. In the extreme cases, all or just one of the differences needs to be lower than the threshold value to result in a background pixel.

According to a second aspect of the present teachings, the above object is achieved by a computer program product comprising a computer-readable medium having computer code instructions stored thereon for carrying out the method of the first aspect when executed by a device having processing capability.

According to a third aspect of the present teachings, the above object is achieved by a device for determining whether pixel positions in an image frame of a video sequence belongs to a background or foreground of a captured scene, the device comprising a processor configured to: receive a class into which the pixel position has been classified, the class representing a type of object in the captured scene at the pixel position; associate the pixel position with a level of dynamics based on its corresponding class, wherein the level of dynamics of a class reflects a probability of pixel values at pixel positions belonging to the class changing values between frames of the video sequence; determine if the pixel position in the image frame belongs to the background or the foreground of the captured scene by comparing the pixel value of the pixel position in the image frame to a background model and a threshold value, the background model including one or more values representing a pixel position, wherein the pixel is determined to belong to the background if a difference between the pixel value and a first predetermined number of values representing the position in the background model is less than the threshold value for the pixel position.

The processor of the device is further configured to, if the pixel position in the image frame is determined to belong to the background: increase the threshold value specific to the pixel position by an increment if the pixel value has changed by more than a second predetermined value since a previous frame, wherein the increment is set to depend on the level of dynamics of the pixel position such that a higher level of dynamics results in a higher increment.

According to a fourth aspect of the present teachings, the above object is achieved by system comprising: a video capturing device adapted to continuously capture a video sequence depicting a scene; a first device adapted to receive a first image frame of the video sequence from the video capturing device, classify each pixel position in the image frame, the class representing a type of object in the captured scene at the pixel position, and output a class for each pixel position in the image frame; a second device according to the third aspect, the second device adapted to receive a second image frame of the video sequence from the video capturing device and to receive a class for each pixel position in the image frame from the first device.

The second, third, and fourth aspects may generally have the same features and advantages as the first aspect. It is further noted that the present teachings relate to all possible combinations of features unless explicitly stated otherwise.

BRIEF DESCRIPTION OF THE DRAWINGS

The above, as well as additional objects, features and advantages of the present teachings, will be better understood through the following illustrative and non-limiting detailed description of embodiments of the present teachings, with reference to the appended drawings, where the same reference numerals will be used for similar elements, wherein:

FIG. 1 shows a scene comprising background objects having different level of dynamics;

FIGS. 2-3 show embodiments of a background model for a pixel position;

DETAILED DESCRIPTION

Figure 4:
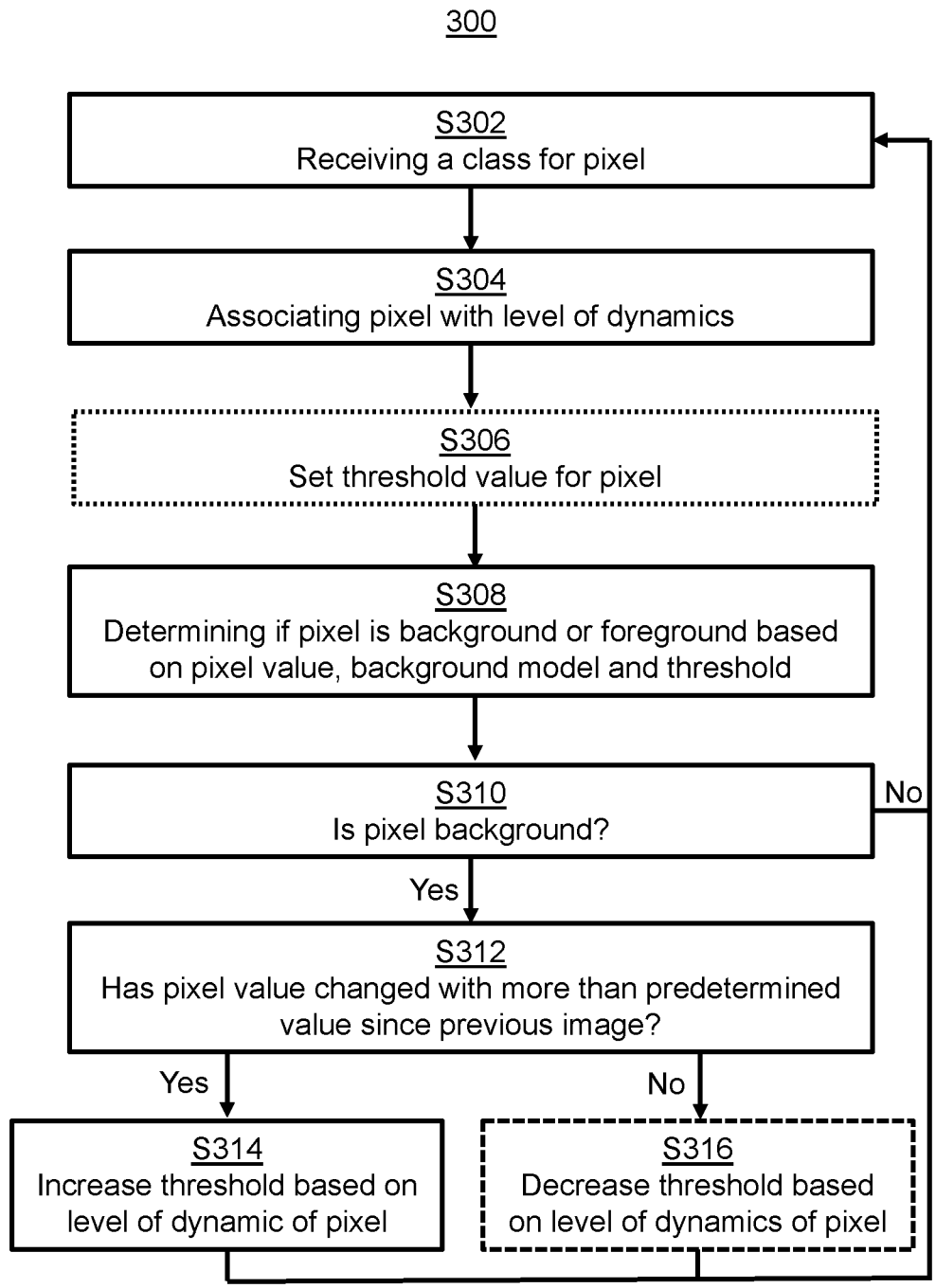
FIG. 4 shows a flow diagram of a method of determining whether pixel positions in an image frame of a video sequence belongs to a background or a foreground according to embodiments.

The present teachings will now be described more fully hereinafter with reference to the accompanying drawings, in which embodiments. The systems and devices disclosed herein will be described during operation.

FIG. 1 shows an image 100 of a scene 101 comprising two background objects 102, 104. Normally, such scene 101 will comprise foreground objects as well, but these are left out for ease of explanation. In the scene, the first background object 102 is a building. The second background object 104 in the scene is a tree. The building 102 is typically a very static object, meaning that very little, or no, differences exist between an image of the building taken at time t, and an image of the building taken at a later time t+n. The tree on the other hand is a dynamic object, in particular when the wind is blowing where the leaves and the branches of the tree may move quite substantially over time. In other words, differences may exist between an image of the tree taken at time t, and an image of the tree taken at a later time t+n. This needs to be considered for example when detecting movement in images of the scene, for example, for monitoring purposes. Such movements are typically only interesting when originating from foreground objects, movements in background should in these cases be ignored. Consequently, there is a need to implement a background detection algorithm that compensates for dynamic objects such that these will still be detected as background, to reduce faulty motion detection and, for example, reduce the number false alarms in a monitoring application.

Embodiments of such background detection algorithms will now be described using FIG. 1 in conjunction with FIG. 4.

The improved background detection may be achieved by, for each pixel position in the image frame 100 (of a video sequence including several image frames) depicting the scene 101, determining a class into which the pixel position has been classified, the class representing a category of content in the captured scene at the pixel position. In FIG. 1, the dashed squares 106, 108 symbolize such classification, where pixels inside the dashed square 106, for example a pixel at a first pixel position 110, is classified as, for example, a building, and where pixels inside the dashed square 108, for example a pixel at a second pixel position 112, is classified as, for example, a tree. It should be noted that the marking 108 around the tree 104, for ease of explanation, is represented by a rectangle. In many applications, the marking would follow the contours of the tree 104.

Such classification may be manual where, for example, an operator has marked 106, 108 the two objects 102, 104 as belonging to different classes, for example a class of trees and a class of buildings. In other embodiments, the class into which the pixel position has been classified is determined using an algorithm for semantic segmentation, for example, a neural network implementation as described above.

The semantic segmentation may in some embodiments be run on a subset of image frames of the video stream. Typically, such algorithms (or manual work) are difficult to run on a real time basis, that is, for every image frame of a video sequence. Advantageously, the semantic segmentation (classification) is only run at certain time intervals, for example, every minute, hour, day, and the like. In other words, the algorithm for semantic segmentation is run on image frames of the video stream at a predetermined interval from each other. For the remaining image frames, a cashed result may be used, for example results from the last performed classification. In other embodiments, the class into which the pixel position has been classified is determined using a combination of results from the semantic segmentation algorithm for said pixel position from a plurality of image frames in said subset of image frames, such as the class being the result in a majority of classifications. In other embodiments, some classes are defined as being "more important" than others, wherein if a pixel position has been classified as one of these classes before, the classification will remain even though the semantic segmentation algorithm (or manual work) results in other classes for that pixel position in some of the following or previous classification procedures.

Typically, if a camera capturing the scene changes field of view, classification needs to be performed again, at least for new parts of the scenes that were not in the field of view previously and thus not classified. In other words, the algorithm for semantic segmentation is run on an image frame captured when a field of view of a video capturing device capturing the video sequence is changed.

The classifications of the pixel positions 110, 112 are then used for determining whether pixel positions 110, 112 in the image frame 100 belongs to a background or a foreground of the captured scene 101. For a specific pixel position, in this example the pixel position 110 classified as a building pixel (inside the rectangle 106 of FIG. 1), the class is received S302 (FIG. 4). The pixel position 110 is then associated S304 with a level of dynamics of its corresponding class, where the level of dynamics of a class reflects a probability of pixel values at pixel positions belonging to the class changing values between frames of the video sequence. This may be accomplished S304 using, for example, a table defining what level of dynamics that specific classes have.

The determined S304 level of dynamics may in some cases, further described below in conjunction with FIG. 5, be used for setting S306 a threshold to be used when determining if the pixel position in the image frame belongs to the background or the foreground.

In some embodiments, the pixel position is associated with a first level of dynamics if its corresponding class belongs to a first predefined group of classes (i.e., a predefined group of classes including buildings), and the pixel position is associated with a second, higher, level of dynamics if its corresponding class belongs to the second predefined group of classes (i.e., a predefined group of classes including trees). More fine grained mapping between classes and level of dynamics may implemented, that is including 3, 5 10, and the like, possible level of dynamics.

Next, it is determined S308 if the pixel position 110 in the image frame 100 belongs to the background or the foreground. This is done by comparing the pixel value of the pixel position 110 in the image frame 100 to a background model and a threshold value. FIGS. 2a and 3a shows two different embodiments of values 202 of background model 200 and a threshold value 204 for the pixel position 110. In the embodiment of FIG. 2a, the values 202 of the background model 200 includes a plurality of pixel values 202 (four in this example, also referred to as background samples below) representing the pixel position 110. Each value 202 is in this example represented by one pixel value, for example representing the luminosity of the pixel. In other examples, each value 202 may be a vector representing red, green, and blue (RGB) intensities of the value of the pixel position.

The pixel position is determined to belong to the background if a difference between the pixel value and (at least) a first predetermined number of values (not shown in the figures) representing the position in the background model 200 is less than the threshold value 204 for the pixel position 110, and as foreground otherwise. So, if the pixel value of the pixel position 110 is 12.9, and the first predetermined number is 2, the pixel position will be determined as belonging to the foreground, since only one of the values 202 in the background model 200 is within the threshold value 204 from the pixel value of the pixel position 110. If the first predetermined number is 1, the pixel position 110 will thus be determined to belong to the background. In case the pixel value of the pixel position 110 is 10, the pixel position will be determined to belong to the background no matter what the first predetermined number is, and the like.

In more detail, denote the observation in pixel m at time t of the image sequence by $x_t(m)$, and the collection of background samples 202 of pixel m by $\{x_i(m)|i=1, \ldots, N\}$. Each observation $x_t = (x_t^{C_1}, \ldots, x_t^{C_k})$ has k channels (e.g., in RGB color space each observation is expressed by three channels of R, G, B). For the pixel position 110 in the image 100, the image data, that is, the intensity value (for each channel if applicable) of that pixel position, is compared to each background sample 202 in the background model 200 associated with the pixel position 110, to see if the image data differs from each of the background samples by less than a threshold $T_r$ 204. For example, background samples which differ from the image data in the pixel by less than the threshold $T_r$ may be associated with the value "one", and the other background samples may be associated with the value "zero" according to:

$$\Gamma_i^c(m) = \begin{cases} 1 & \text{if } |x_i^c(m) - x_t^c(m)| \le T_r \\ 0 & \text{otherwise} \end{cases} \quad (1)$$

In the example of FIGS. 2a, 3a, $T_r=2$.

If the number of background samples 202 in the background model 200 which differs from the image data of the pixel by less than the threshold $T_r$ is above or equal to the first predetermined number of values $T_N$, the pixel at the pixel position 110 is determined to belongs to the background. Otherwise it belongs to the foreground.

This may be implemented by calculating a binary mask $B_t$ which at time t takes the value "one" for background pixels and "zero" for foreground pixels according to:

$$B_t(m) = \begin{cases} 1 & \text{if } \sum_{i=1}^{N} \Gamma_i^c(m) \ge T_N, \forall c \in \{C_1, \ldots, C_k\} \\ 0 & \text{otherwise} \end{cases} \quad (2)$$

Expressed differently, the number of background samples 202 in the background model 200 which differs from the image data at the pixel position 110 by less than the threshold $T_r$ 204 is counted. If the number is equal to or exceeds a first predetermined number of values $T_N$, it is determined that the pixel belongs to the background, and otherwise to the foreground. Thus, if at least $T_N$ background samples 202 in the background model 200 if found which are similar (in the sense of equation 1) to the image data at the pixel position 110, the pixel at the pixel position 110 will be classified as belonging to the background, and otherwise to the foreground.

In yet other words, step of determining S308 if the pixel position 110 in the image frame 100 belongs to the background or the foreground of the captured scene comprises: calculating a difference between a pixel value in the image frame 100 at the pixel position 110 and the plurality of values 202 of the background model 200 at the corresponding pixel position, calculating a number of differences being less than the threshold value 204 which is specific to the pixel position, and determining that the pixel position in the image frame belongs to the background if the calculated number exceeds or equals the first predetermined number of values, and that the pixel position in the image frame otherwise belongs to the foreground.

FIG. 3a shows another example of a background model 200. In this case, the background model 200 includes one value 202 representing the pixel position 110, wherein the step of determining S308 whether the pixel position 110 in the image frame 100 belongs to the background or the foreground of the captured scene comprises: calculating a difference between a pixel value in the image frame at the pixel position 110 and a value 202 of the background model 200 at the corresponding pixel position, and determining that the pixel position in the image frame belongs to the background if the difference is lower than the threshold value 204 which is specific to the pixel position, and that the pixel position in the image frame otherwise belongs to the foreground.

FIGS. 2b and 3b shows by way of example two background models 200 for the pixel position 112 (i.e., classified as a tree). As can be seen from the examples of FIGS. 2a, 3a, the difference(s) between the value(s) 202 of the background model 200 and the pixel value at the pixel position 112 are allowed to be larger compared to what was described above regarding pixel position 110 classified as a tree, due to a larger threshold value 204.

Other ways of defining the background model 200 may be implemented. For example, the values of the background model for a pixel position may be represented by a Gaussian distribution having a mean value and a standard deviation. In this case, the step of determining S308 whether the pixel position in the image frame belongs to the background or the foreground of the captured scene comprises: calculating a difference between a pixel value in the image frame at the pixel position and the mean value, and normalizing the difference by the standard deviation, and determining that the pixel position in the image frame belongs to the background if the normalized difference is lower than the threshold value which is specific to the pixel position, and that the pixel position in the image frame otherwise belongs to the foreground.

The values 202 of the background model 200 (e.g., the pixel value(s) or Gaussian distribution) is advantageously updated in regular intervals. For example, the pixel values 202 of the model of FIGS. 2a-b may be implemented as a FIFO queue, which is updated every n image frame with the pixel value of the pixel position in this frame, or in any other suitable way.

To adapt to the level of dynamics of the pixel position, the threshold value needs to be updated. This may be accomplished by initializing or resetting the threshold value S306 based on the level of dynamics at certain times (see further below). The threshold value may also be increased under some circumstances. Specifically, if the pixel position is determined to belong to the background, the difference between the pixel value of the pixel position 110, 112, and the pixel value at the corresponding pixel position (i.e., same pixel position) in a previous frame is calculated S312. The previous frame may be the frame immediately preceding the current image frame 100, or a frame being n number of frames before the current image frame 100, depending on the use case. If the pixel value has changed by more than a second value since a previous frame, the threshold value specific to the pixel position is increased S314 by an increment. To faster adapt to a relatively higher level of dynamics for certain pixel positions, a higher level of dynamics results in a higher increment. Consequently, the probability that these pixel positions is determined to belong to the foreground by mistake is reduced, since the threshold value is set to increase with a higher increment under the above circumstances. The second value may be predetermined, and be a static value used for all pixel positions. The second value may be set to depend on the threshold value of the corresponding pixel position. The second value may also be set to depend on the level of dynamics associated with the pixel position.

In some embodiments, if the pixel position in the image frame is determined to belong to the background, the threshold value may also be decreased S316. Specifically, the threshold value specific to the pixel position is decreased S316 by a decrement if the pixel value at the pixel position in the image frame has changed by less than the second value since a previous frame, wherein the decrement is set to depend on the level of dynamics of the pixel position such that a higher level of dynamics results in a lower decrement. Consequently, the threshold value for a dynamic pixel position is not lowered too quickly just because the pixel value of the pixel position happens to stay similar between frames. This facilitates a fast adaptation to increased differences again, for example in a scenario when the wind starts blowing again in the embodiment of the pixel position being classified as a tree.

Typically, the decrement is lower than the corresponding increment, which also facilitates a fast adaptation in the above scenario.

It should be noted that according to some embodiments, there may exist a class (several classes) for which the threshold value is maintained at a constant level. For example, in case the stem of the tree is a class separate from the tree crown, the threshold value for pixel positions classified as the stem may be kept static. In other words, if the class corresponding to the pixel position belongs to a third predefined group of classes (in this example including a stem of a tree), the threshold value which is specific to the pixel position is maintained at a constant level. Consequently, dynamic background may be disabled for certain parts of the scene, facilitating an increased flexibility for the background detection algorithm.

As described above, optionally, the algorithm described in FIG. 4 may comprise the step of setting S306 the threshold value for each pixel position. It should be noted that according to other embodiments, the step of setting the threshold value is a mandatory step, and the steps S310, S312, S314 and S316 for updating the threshold value are optional. Such embodiments will be described below in conjunction with FIG. 5. Below, the step of setting S306 the threshold value for each pixel position will also be elaborated on. The discussion below thus also applies to the corresponding optional step S306 of the method of FIG. 4.

Figure 5:
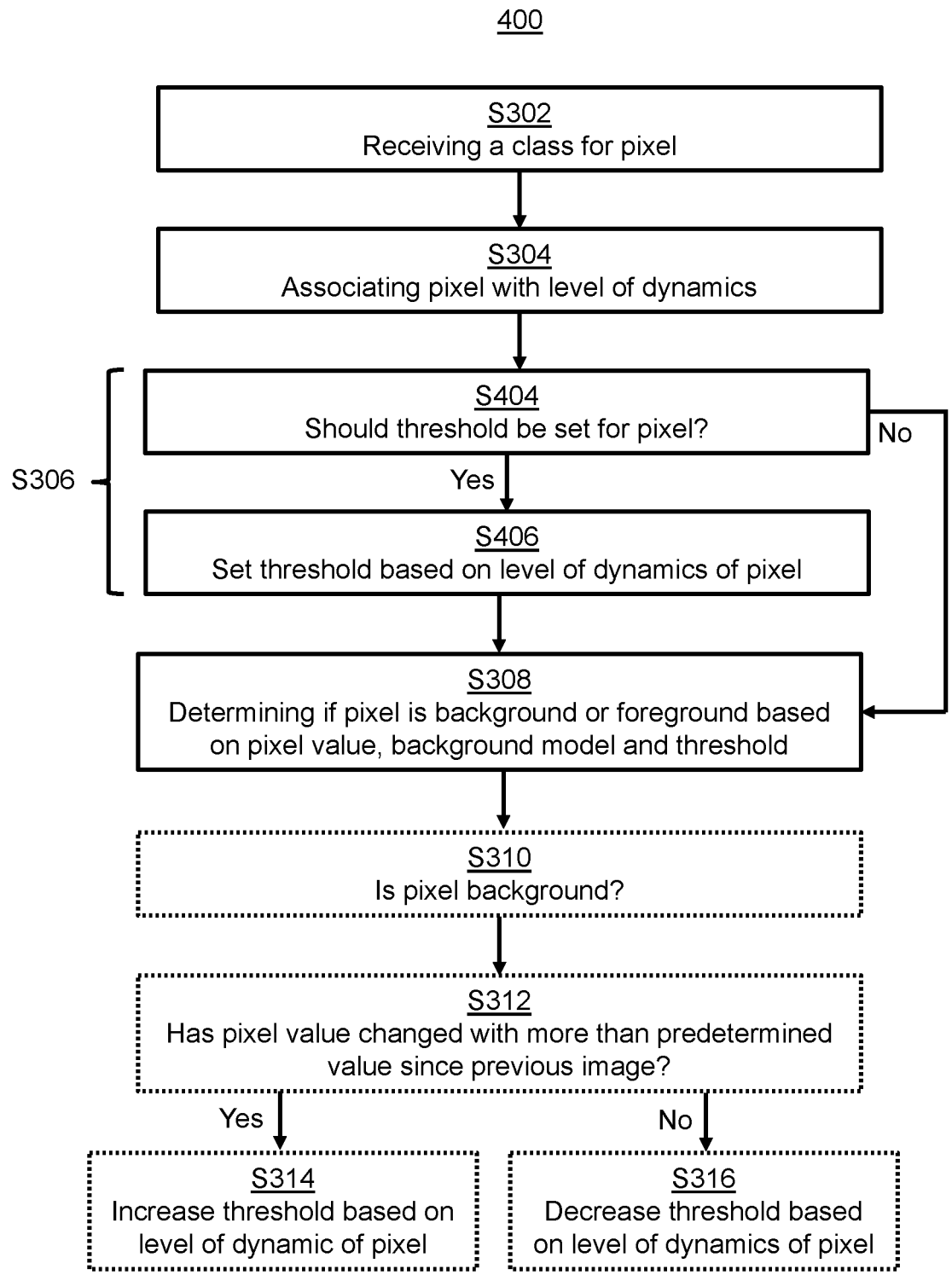
FIG. 5 shows a flow diagram of a method of determining whether pixel positions in an image frame of a video sequence belongs to a background or a foreground according to other embodiments.

The method of FIG. 5 comprises the steps of receiving S302 a class for a pixel position, and determining/associating S304 a level of dynamics for the pixel position. After this, it is determined if a new threshold should be set S404 for the pixel position. If it is determined that a new threshold should be set for the pixel position, the threshold specific to the pixel position is set S406 to a value, wherein the value depends on the level of dynamics of the pixel position such that a higher level of dynamics results in a higher value. Otherwise, in case the threshold should not be set S406, the step of determining S308 if the pixel position in the image frame belongs to the background or the foreground step is performed directly as described above using a current threshold.

According to one example, the step of setting S406 the threshold value is performed for an initial frame of the video stream. Alternatively, or additionally, the step of setting S406 the threshold value is performed when a field of view of a video capturing device capturing the video sequence is changed. The step of setting S406 the threshold may also be performed on image frames of the video stream at a predetermined interval from each other.

It should be noted that except for the threshold value described above, other preferences for how background and foreground should be detected may be set using level of dynamics for a pixel position. For example, the methods described herein may further comprise setting a lower threshold for the threshold value which is specific to the pixel position depending on the level of dynamics of the pixel position, the lower threshold determining a minimum possible value for the threshold value, such that a higher level of dynamics results in a higher value of the lower threshold. This may reduce the risk that the step of decreasing S316 the threshold value results in a too low threshold value in occasions where an area in the scene which is defined as dynamic (through the classification) is (almost) static during a period of time.

The methods described above may be implemented in software and/or hardware, for example as a computer program product comprising a computer-readable storage medium with instructions adapted to carry out the methods described herein when executed by a device having processing capability. The methods may thus be implemented in a device comprising a processor adapted for performing the methods described herein. The device may be part of a system of devices, which system will be exemplified below in conjunction with FIG. 6.

Figure 6:
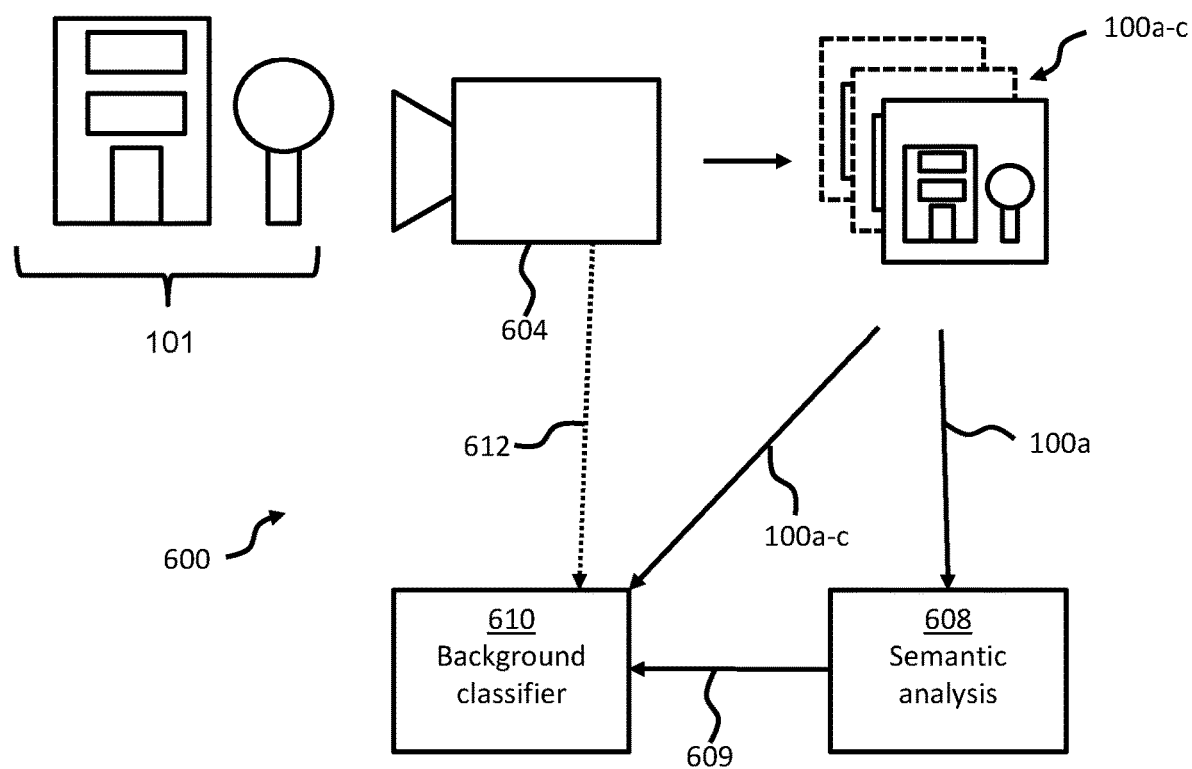
FIG. 6 shows by way of example a system for capturing a video sequence of a scene and determining whether pixel positions in an image frame of the video sequence belongs to a background or a foreground.

The system 600 of FIG. 6 includes a video capturing device adapted to continuously capture a video sequence (including a plurality of image frames 100a-c) depicting a scene 101. The system comprises a first device 608 (denoted as a device for semantic analysis in FIG. 6) which is adapted to receive a first image frame 100a of the video sequence from the video capturing device 604, classify each pixel position in the image frame 100a, the class representing a type of object in the captured scene at the pixel position, and output 609 a class for each pixel position in the image frame 100a. As described above, the first device 608 may perform such classification on image frames selected based on a number of prerequisites such as if the frame is captured at a certain time interval from a previously image frame used for classification, or if the video capturing device 604 has changed field of view, and the like.

The system further comprises a second device 610 (denoted as a background classifier in FIG. 6), which is adapted to receive the output 609 from the first device 608, that is, a class for each pixel position in the first image frame 100a from the first device, and at least a second image frame 100b-c of the video sequence of the video capturing device, and perform background classification (background analysis and the like) on the pixels of the received second image frame as described above. It should be noted that such background classification of course also can be made on the first image frame 100a.

According to some embodiments, the second device 610 is also receiving input 612 from the video capturing device 604 which is used for determining if the threshold value should be set (S306 in FIGS. 4-5), as described above. It should also be noted that the first and second devices 608, 610 may be implemented in a same physical device, or in the video capturing device 604.

It will be appreciated that a person skilled in the art can modify the above-described embodiments in many ways and still use the advantages of the present teachings as shown in the embodiments above.

For example, according to some embodiments (not shown in FIG. 6), the second device is adapted to output data relating to which pixel positions in the second image frame belongs to the background and foreground of the captured scene. The system may then comprise a third device adapted to receive the video sequence 100 a-c from the video capturing device 604, and detect motion in the second image frame, and output data relating to the detected motion in the second image frame. This output may be received by a fourth device adapted to receive the outputted data from the second device and the outputted data from the third device and use the received data for tracking objects in the video stream.

Thus, the present teachings should not be limited to the shown embodiments but should only be defined by the appended claims. Additionally, as the skilled person understands, the shown embodiments may be combined.

What is claimed is:

1. A method of determining whether pixel positions in an image frame of a video sequence belong to a background or a foreground of a captured scene, the method comprising, for each pixel position in the image frame:

receiving a class into which the pixel position has been classified, the class representing a category of content in the captured scene at the pixel position;

associating the pixel position with a level of dynamics of its corresponding class, wherein the level of dynamics of a class reflects a probability that pixel values at pixel positions belonging to the class will change values between frames of the video sequence;

determining if the pixel position in the image frame belongs to the background or the foreground of the captured scene by comparing the pixel value of the pixel position in the image frame to a background model and a threshold value for the pixel position, the background model including one or more values representing the pixel value of the pixel position, wherein the pixel position is determined to belong to the background if a difference between the pixel value and a first predetermined number of values among the one or more values in the background model is less than the threshold value for the pixel position; and if the pixel position in the image frame is determined to belong to the background:

increasing the threshold value specific to the pixel position by an increment if the pixel value at the pixel position in the image frame has changed by more than a second value since a previous frame, wherein the increment is set to depend on the level of dynamics of the pixel position such that a higher level of dynamics results in a higher increment.

2. The method of claim 1, further comprising:

if the pixel position in the image frame is determined to belong to the background:

decreasing the threshold value specific to the pixel position by a decrement if the pixel value at the pixel position in the image frame has changed by less than the second value since a previous frame, wherein the decrement is set to depend on the level of dynamics of the pixel position such that a higher level of dynamics results in a lower decrement.

3. The method of claim 1, further comprising:

setting the threshold value which is specific to the pixel position to a value, wherein the value depends on the level of dynamics of the pixel position such that a higher level of dynamics results in a higher value.

4. The method of claim 3, wherein the setting the threshold value is performed for an initial frame of the video stream.

5. The method of claim 3, wherein the setting the threshold value is performed when a field of view of a video capturing device capturing the video sequence is changed.

6. The method of claim 1, further comprising setting a lower threshold for the threshold value which is specific to the pixel position depending on the level of dynamics of the pixel position, the lower threshold determining a minimum possible value for the threshold value, such that a higher level of dynamics results in a higher value of the lower threshold.

7. The method of claim 1, wherein the pixel position is associated with a first level of dynamics if its corresponding class belongs to a first predefined group of classes, and the pixel position is associated with a second, higher, level of dynamics if its corresponding class belongs to the second predefined group of classes.

8. The method of claim 7, wherein if the class corresponding to the pixel position belongs to a third predefined group of classes, the threshold value which is specific to the pixel position is maintained at a constant level.

9. The method of claim 1, wherein the class into which the pixel position has been classified is determined using an algorithm for semantic segmentation.

10. The method of claim 9, wherein the algorithm for semantic segmentation is run on a subset of image frames of the video stream.

11. The method of claim 10, wherein the class into which the pixel position has been classified is determined using a combination of results from the semantic algorithm for said pixel position from a plurality of image frames in said subset of image frames.

12. The method of claim 1, wherein the background model includes a plurality of values representing the pixel value of the pixel position, wherein the determining if the pixel position in the image frame belongs to the background or the foreground of the captured scene comprises:
calculating a difference between a pixel value in the image frame at the pixel position and each of the plurality of values of the background model at the corresponding pixel position;
calculating a number of differences being lower than the threshold value which is specific to the pixel position; and
determining that the pixel position in the image frame belongs to the background if the calculated number exceeds or equals the first predetermined number of values, and that the pixel position in the image frame otherwise belongs to the foreground.

13. A computer program product comprising a non-transitory computer-readable storage medium including instructions which, when executed by a device having a processing capability, cause the device to execute instructions for determining whether pixel positions in an image frame of a video sequence belong to a background or a foreground of a captured scene, the instructions causing the device to perform operations comprising, for each pixel position in the image frame:
receiving a class into which the pixel position has been classified, the class representing a category of content in the captured scene at the pixel position;
associating the pixel position with a level of dynamics of its corresponding class, wherein the level of dynamics of a class reflects a probability of that pixel values at pixel positions belonging to the class changing will change values between frames of the video sequence;
determining if the pixel position in the image frame belongs to the background or the foreground of the captured scene by comparing the pixel value of the pixel position in the image frame to a background model and a threshold value for the pixel position, the background model including one or more values representing the pixel value of the pixel position, wherein the pixel position is determined to belong to the background if a difference between the pixel value and a first predetermined number of values among the one or more values in the background model is less than the threshold value for the pixel position; and
if the pixel position in the image frame is determined to belong to the background:
increasing the threshold value specific to the pixel position by an increment if the pixel value at the pixel position in the image frame has changed by more than a second value since a previous frame, wherein the increment is set to depend on the level of dynamics of the pixel position such that a higher level of dynamics results in a higher increment.

14. A device for determining whether pixel positions in an image frame of a video sequence belongs to a background or foreground of a captured scene, the device comprising a processor configured to:
receive a class into which the pixel position has been classified, the class representing a type of object in the captured scene at the pixel position;
associate the pixel position with a level of dynamics based on its corresponding class, wherein the level of dynamics of a class reflects a probability that pixel values at pixel positions belonging to the class will change values between frames of the video sequence;
determine if the pixel position in the image frame belongs to the background or the foreground of the captured scene by comparing the pixel value of the pixel position in the image frame to a background model and a threshold value for the pixel position, the background model including one or more values representing a pixel position, wherein the pixel is determined to belong to the background if a difference between the pixel value and a first predetermined number of values among the one or more values in the background model is less than the threshold value for the pixel position; and
if the pixel position in the image frame is determined to belong to the background:
increasing the threshold value specific to the pixel position by an increment if the pixel value has changed by more than a second value since a previous frame, wherein the increment is set to depend on the level of dynamics of the pixel position such that a higher level of dynamics results in a higher increment.

15. A system comprising:
a video capturing device configured to continuously capture a video sequence depicting a scene;
a first device configured to receive a first image frame of the video sequence from the video capturing device, classify each pixel position in the image frame, the class representing a type of object in the captured scene at the pixel position, and output a class for each pixel position in the image frame; and
a second device configured to receive a second image frame of the video sequence from the video capturing device and to receive a class for each pixel position in the first image frame from the first device, wherein the second device comprises a processor configured to:
receive a class into which the pixel position has been classified, the class representing a type of object in the captured scene at the pixel position;
associate the pixel position with a level of dynamics based on its corresponding class, wherein the level of dynamics of a class reflects a probability that pixel values at pixel positions belonging to the class will change values between frames of the video sequence;
determine if the pixel position in the image frame belongs to the background or the foreground of the captured scene by comparing the pixel value of the pixel position in the image frame to a background model and a threshold value for the pixel position, the background model including one or more values representing a pixel position, wherein the pixel is determined to belong to the background if a difference between the pixel value and a first predetermined number of values among the one or more values in the background model is less than the threshold value for the pixel position; and
if the pixel position in the image frame is determined to belong to the background:
increasing the threshold value specific to the pixel position by an increment if the pixel value has changed by more than a second value since a previous frame, wherein the increment is set to depend on the level of dynamics of the pixel position such that a higher level of dynamics results in a higher increment.

* * * * *